US006543216B2

(12) United States Patent
Asai et al.

(10) Patent No.: US 6,543,216 B2
(45) Date of Patent: Apr. 8, 2003

(54) HEATING DEVICE FOR EXTERNAL COMBUSTION ENGINE

(75) Inventors: Masahiro Asai, Saitama (JP); Masaki Ban, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/058,170

(22) Filed: Jan. 29, 2002

(65) Prior Publication Data

US 2002/0100270 A1 Aug. 1, 2002

(30) Foreign Application Priority Data

Jan. 29, 2001 (JP) ....................................... 2001-020637

(51) Int. Cl.$^{7}$ .................................................. F02C 5/00

(52) U.S. Cl. .......................................... 60/39.6; 60/517

(58) Field of Search .................................. 60/39.6, 517

(56) References Cited

U.S. PATENT DOCUMENTS 4,118,171 A * 10/1978 Flanagan ..................... 431/10
4,547,356 A * 10/1985 Papineau .................... 423/658
5,272,871 A * 12/1993 Oshima et al. ............... 60/274

* cited by examiner

*Primary Examiner*—Hoang Nguyen
(74) *Attorney, Agent, or Firm*—Birch, Stewart, Kolasch & Birch, LLP

(57) ABSTRACT

To provide a heating device for an external combustion engine, which is capable of improving the stabilization of combustion in a controlled state with a relatively small quantity of heat and for controlling the properties of an exhaust gas. An increased long-time operation of the external combustion engine is achieved by the present invention. A heating device for an external combustion engine includes a combustion housing provided for surrounding a heating portion of an external combustion engine. An fuel-air mixer is provided at one end of the combustion housing and an exhaust pipe provided at the other end of the combustion housing. An oxidation catalyst is disposed in the combustion housing for accelerating the combustion of a fuel-air mixture of fuel and air supplied through the fuel-air mixer.

16 Claims, 2 Drawing Sheets

HEATING DEVICE FOR EXTERNAL COMBUSTION ENGINE

BACKGROUND OF THE INVENTION

1. Cross-Reference to Related Applications

The present application claims priority under 35 USC 119 to Japanese Patent Application No. 2001-020637 filed on Jan. 29, 2001 the entire contents thereof is hereby incorporated by reference.

2. Field of the Invention

The present invention relates to a heating device for an external combustion engine such as a Stirling engine.

3. Description of Background Art

In Stirling engines, an electric heater using a battery as a power source or a burner for burning a fuel has been used as a heating device for heating a heating portion, that is, an expansion chamber of the Stirling engine.

By the way, an electric heater as a heating device is suitable for a relatively small-sized Stirling engine because an energy density of the existing battery used as a power source for the electric heater is in the order of about 50 to 100 wh/kg. However, the electric heater fails to satisfy a long-time operation for the Stirling engine. On the other hand, a burner is suitable for a large-size Stirling engine because it can generate a large quantity of heat. However, the burner is unsuitable for a small-sized Stirling engine in terms of stabilization of combustion in a control state with a small quantity of heat and the property of an exhaust gas.

SUMMARY AND OBJECTS OF THE INVENTION

In view of the foregoing, the present invention has been made, and an object of the present invention is to provide a heating device for an external combustion engine, which is capable of improving stabilization of the combustion in a controlled state with a relatively small quantity of heat and for improving the properties of an exhaust gas. The present invention realizes an increased operation of the external combustion engine.

To achieve the above object, according a first feature of the present invention, there is provided a heating device for an external combustion engine which includes a combustion housing provided for surrounding a heating portion of an external combustion engine. An fuel-air mixer is provided at one end of the combustion housing. An exhaust pipe is provided at the other end of the combustion housing. An oxidation catalyst is disposed in the combustion housing for accelerating combustion of a fuel-air mixture of a fuel and air supplied through the fuel-air mixer. It is to be noted that the external combustion engine and the heating portion correspond to a Stirling engine E and an expansion chamber 11 in an embodiment of the present invention to be described later, respectively.

With this first feature, since the catalyst type heating device is adopted, it is possible to realize continuous combustion in a controlled state with a relatively small quantity of heat, and hence to stably heat the heating portion of the external combustion engine. Further, since continuous combustion by adopting the catalyst type heating device improves the property of the exhaust gas and eliminates the occurrence of combustion oscillation, it is possible to operate the small-sized external engine with comfort for a long time.

According to a second feature of the present invention, in addition to the first feature, the oxidation catalyst is supported by an outer surface of the heating portion disposed in the combustion housing.

With the second feature, since the thermal transfer from the catalyst to the heating portion of the external combustion engine is improved, it is possible to enhance a thermal efficiency and hence to contribute to reduction in fuel consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described with reference to the accompanying drawings, in which an embodiment of the present invention is shown.

Figure 1:
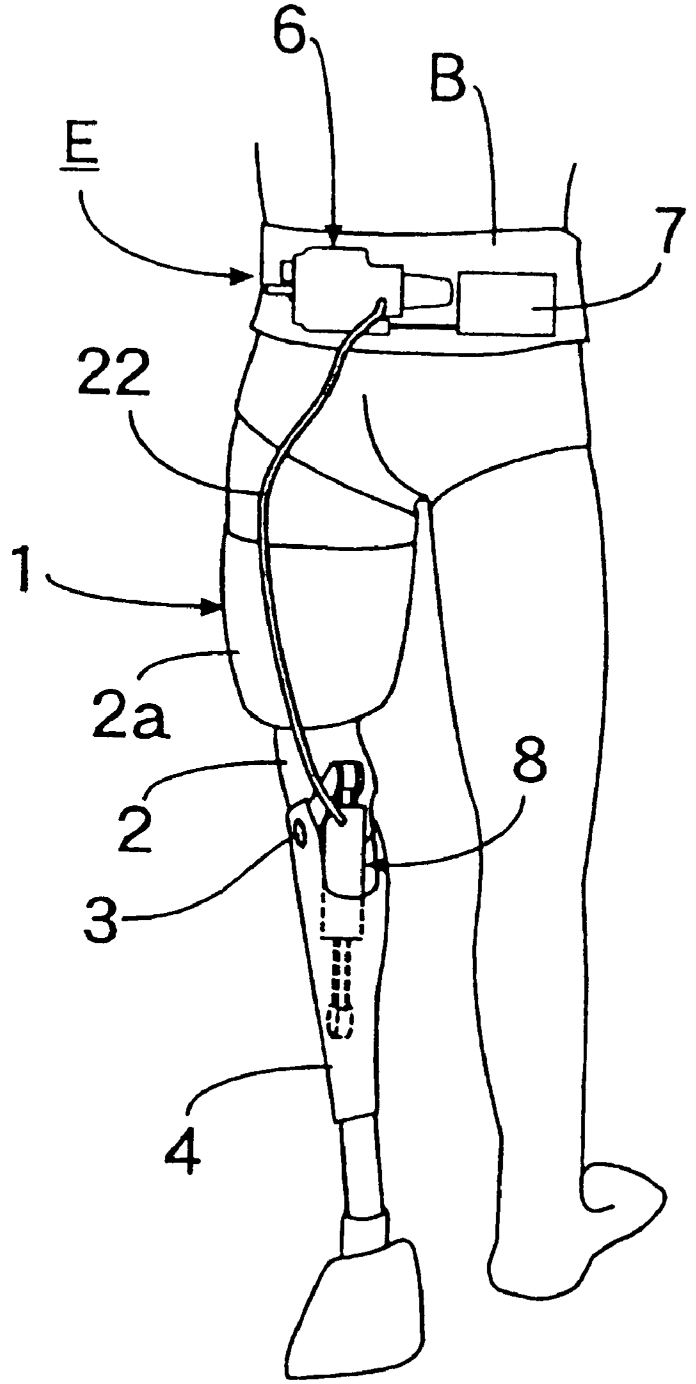
FIG. 1 is a rear view of a user wearing a drive unit for a prosthetic limb, which includes a Stirling engine, according to an embodiment of the present invention.
Figure 2:
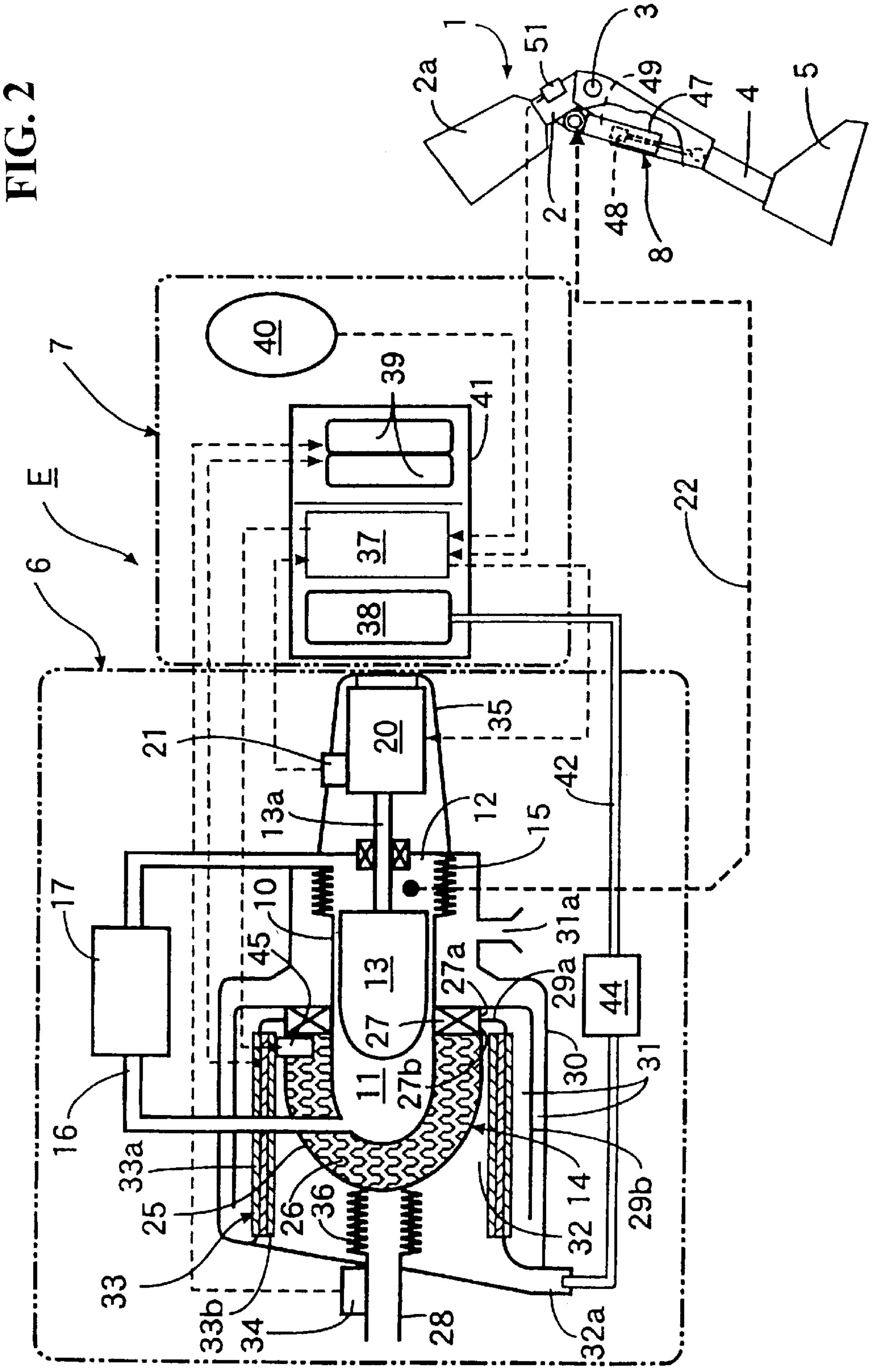
FIG. 2 is a vertical sectional view of the Stirling engine shown in FIG. 1.

As illustrated in FIGS. 1 and 2, a Stirling engine E of the present invention is used for driving a prosthetic leg 1. The prosthetic leg 1 includes a thigh portion 2 integrated with a socket **2*a* in which a user's remaining thigh portion is to be inserted. A shank portion 4 is bendably/stretchably connected to a lower end of the thigh portion 2 via a joint 3. A foot portion 5 is connected to a lower end of the shank portion 4**.

The Stirling engine E includes a displacer unit 6 and a control unit 7, which are mounted on a belt B worn around a user' waist portion. A power cylinder unit 8 is mounted between the thigh portion 2 and the shank portion 4 of the prosthetic leg 1. A flexible pressure conduit 22 is provided for transmitting a pressure generated in the displacer unit 6 to the power cylinder unit 8. A configuration of the Stirling engine E will be more fully described with reference to FIG. 2.

The displacer unit 6 includes a displacer cylinder 10. A displacer piston 13 is slidably inserted in the cylinder 10 for partitioning the interior of the cylinder 10 into an expansion chamber 11 on a head side of the cylinder 10 and a compression chamber 12 on a bottom side of the cylinder 10. A heating device 14 is provided around the head portion of the displacer cylinder 10 for heating the expansion chamber 11. A radiator 15 is provided on the bottom portion of the displacer cylinder 10 for cooling the compression chamber 12. A heat regenerator 17 is interposed in a communication port 16 for connecting the expansion chamber 11 to the compression chamber 12. A motor-driven control actuator 20 is provided for driving the displacer piston 13 via a rod 18 passing through the bottom portion of the displacer cylinder 10. A displacer piston sensor 21, for detecting a position of the displacer piston 13, is provided on the control actuator 20.

The heating device 14 is of a catalyst type in which a combustion housing 25 formed on an outer surface of the head portion of the displacer cylinder 10 is filled with an oxidation catalyst 26. A fuel-air mixer 27 is provided at one end portion of the combustion housing 25, and an exhaust pipe 28 is provided at the other end of the housing 25. In this case, the catalyst 26 is also supported by an outer surface of the heated portion of the external combustion engine. The fuel-air mixer 27 has a fuel port **27*b* and an air port 27*a*** adjacent to each other.

The displacer cylinder 10, the radiator 15, and the combustion housing 25 are covered with a shroud 30. The shroud 30 has an air introduction port **31*a* at a position near the radiator 15 and a fuel introduction port 32*a* at a position near the exhaust pipe 28. A first partition wall 29*a* for surrounding the combustion housing 25 and a second partition wall 29*b* for surrounding the first partition wall 29*a* are disposed in the shroud 30. With the partition walls 29*a* and 29*b* and the shroud 30, an air passage 31 for communicating the air introduction port 31*a* to the air port 27*a* while meandering therebetween is partitioned from a fuel passage 32 for communicating the fuel introduction port 32*a* to the fuel port 27*b* along an outer periphery of the combustion housing 25. A radiator 36 is additionally provided on an outer peripheral surface of the exhaust pipe 28 for facing to the fuel passage 32**.

A solid electrolyte device 33 is additionally provided on the first partition wall **29*a*. The solid electrolyte device 33 generates power with an air pole 33*a* thereof facing to the air passage 31 and a fuel pole 33*b* thereof facing to the fuel passage 32. A thermal-electric converting device 34 is additionally provided on an outer peripheral surface of the exhaust pipe 28. The thermal-electric converting device 34 converts heat transferred from the exhaust pipe 28 thereto into electricity, to thus generate power. An output from the thermal-electrical converting device 34 is charged in a storage battery 39** to be described later.

A supporting wall 35 is provided for containing the control actuator 20 while supporting a fixed portion of the actuator 20. The supporting wall 35 is continuous to the shroud 30.

The control unit 7 includes an electronic control unit 37, a fuel cartridge 38, the storage battery 39 as a power source for the electronic control unit 37, and a manually operated controller 40 for arbitrarily operating the electronic control unit 37. The electronic control unit 37, the fuel cartridge 38, and the storage battery 39 are contained in a control box 41. The fuel cartridge 38 is filled with fuel such as butane.

The fuel cartridge 38 is connected to the fuel introduction port **32*a* via a fuel conduit 42, and a fuel adjuster 44 for adjusting a flow rate of fuel is interposed in the fuel conduct 42. An ignition plug 45 is provided in the combustion housing 25 at a position adjacent to the mixer 27**.

The power cylinder unit 8 includes a power cylinder 47 pivotably connected to one of the thigh portion 2 and the shank portion 4, and a power piston 48 pivotably connected to the other of the thigh portion 2 and the shank portion 4 while slidably inserted in the power cylinder 47. An operation chamber 49 defined in the power cylinder 47 by means of the power piston 48 is communicated to the compression chamber 12 of the displacer unit 6.

A bending/stretching angle sensor 51 for detecting a bending/stretching angle between the thigh portion 2 and the shank portion 4 is mounted at a position between the thigh portion 2 and the shank portion 4. An output signal from the bending/stretching angle sensor 51, an output signal from the manually operated controller 40 and the displacer piston sensor 21 are inputted into the electronic control unit 37. On the basis of these signals, the electronic control unit 37 controls the actuator 20 and the fuel adjuster 44.

A function of this embodiment will be described below.

Fuel is fed from the fuel cartridge 38. The flow rate of the fuel is adjusted by the fuel adjuster 44. The fuel is then supplied to the fuel-air mixer 27 via the fuel passage 32, to be mixed with air which flows from the air introduction port **31*a* into the fuel-air mixer 27 via the air passage 31. The fuel-air mixture is ignited once by the ignition plug 45, and thereafter, the combustion of the fuel-air mixture is continuously accelerated by the catalyst 26, to heat the expansion chamber 11 from the head portion side of the displacer cylinder 10 at a specific high temperature. An exhaust gas generated by the combustion is discharged to the outside through the exhaust pipe 28. In the meanwhile, heat radiated from the combustion housing 25 and the radiator 36 preheats a fuel gas passing through the fuel passage 32, thereby contributing to acceleration of both electrolytic power generation by the solid electrolyte device 33 and combustion in the combustion housing 25**.

The radiator 15 keeps the compression chamber 12 in a specific low temperature state. The heat regenerator 17 receives heat from a working gas which is moving between the expansion chamber 11 and the compression chamber 12 via the communication port 16.

The control actuator 20 is operated on the basis of a command from the electronic control unit 37, to reciprocate the displacer piston 13, thereby generating a pressure amplitude in the compression chamber 12. The pressure is transmitted to the operation chamber 49 of the power cylinder 47 via the flexible pressure conduit 22, to reciprocate the power piston 48, thereby bending/stretching the shank portion 4 relative to the thigh portion 2. The bending/stretching motion of the shank portion 2 relative to the thigh portion 4 provides assistance for the walking of the user.

At this time, to efficiently drive the power piston 48, the electronic control unit 37 identifies a position of the power piston 48 on the basis of an output signal from the bending/stretching angle sensor 51, and operates the control actuator 20 such that the displacer piston 13 is in advance of the power piston 48 by a converted crank angle of 90°. Further, the electronic control units 37 may control the operational speed of the displacer piston 13 from zero to an arbitrary value so as to control the bending/stretching speed of the shank portion 4 relative to the thigh portion 2 from zero to an arbitrary value. With this configuration, the prosthetic leg 1 can be moved on the basis of the user's intention.

The combustion formed by the catalyst type heating device 14 is continuous combustion which is stable even in a controlled state with a relatively small quantity of heat, so that it is possible to enhance the property of an exhaust gas and eliminate the occurrence of combustion oscillation. Further, since the fuel cartridge 38 is adopted, it is possible to rapidly supplement fuel and also to stably heat the expansion chamber 11 of the displacer cylinder 10 for a long-time. This makes it possible to assist the walking of the user to provide comfort for a long time by utilizing long-time operation of a small-sized Stirling engine E.

Since the catalyst 26 of the heating device 14 is directly supported by the outer surface of the heated portion of the external combustion engine, the thermal transfer of heat from the catalyst 26 to the heated portion of the external combustion engine can be improved. Accordingly, it is possible to enhance a thermal efficiency and hence to contribute to a reduction in fuel consumption.

Since the power consumption of the storage battery 39 as the power source for the electronic control unit 37 is very small and the storage battery 39 is charged with electricity outputted from the solid electrolyte device 33 and the thermal-electric converting device 34, the useful life of the storage battery 39 is increased.

Since only the power cylinder unit 8 is provided on the prosthetic leg 1 while the relatively heavy displacer unit 6, the fuel cartridge 38, the electronic control unit 37, etc. are mounted on the belt B worn around the user's waist portion, and the displacer unit 6 is connected to the power cylinder unit 8 via the flexible pressure conduit 22, it is possible to make the prosthetic leg 1 lightweight and slim while ensuring the smooth bending/stretching motion of the prosthetic leg 1, and further it is possible for the user to easily, rapidly, and simply mount/dismount the displacer unit 6 by mounting/dismounting the belt B around the waist portion.

The present invention is not limited to the above-described embodiment, and it is to be understood that various changes in design may be made without departing from the scope of the present invention. For example, the heating device of the present invention can be also applied to an $\alpha$-type Stirling engine and to an external combustion engine other than the Stirling engine.

As described above, according to the first feature, there is provided a heating device for an external combustion engine including a combustion housing provided so as to surround a heating portion of an external combustion engine. An fuel-air mixer is provided at one end of the combustion housing and an exhaust pipe is A provided at the other end of the combustion housing. An oxidation catalyst, disposed in the combustion housing, is provided for accelerating combustion of a fuel-air mixture of fuel and air supplied through the fuel-air mixer. With this heating device, it is possible to realize continuous combustion in a controlled state with a relatively small quantity of heat, and hence to stably heat the heating portion of the external combustion engine. Further, since the continuous combustion realized by the heating device improves the property of an exhaust gas and eliminates the occurrence of combustion oscillation, it is possible to operate the small-sized external engine with comfort for a long time.

According to the second feature of the present invention, the oxidation catalyst is supported by an outer surface of the heating portion disposed in the combustion housing. With this feature, since the thermal transfer from the catalyst to the heating portion of the external combustion engine is improved, it is possible to enhance a thermal efficiency and hence to contribute to reduction in fuel consumption.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heating device for an external combustion engine comprising:
   - a combustion housing for surrounding a heating portion of an external combustion engine;
   - a fuel-air mixer provided at one end of said combustion housing;
   - an exhaust pipe provided at the other end of said combustion housing; and
   - an oxidation catalyst, disposed in said combustion housing, for accelerating combustion of a fuel-air mixture of a fuel and air supplied through said fuel-air mixer;
   - said oxidation catalyst is directly supported by an outer surface of the heated portion of the external combustion engine for transferring heat directly to the heated portion of the external combustion engine.

2. The heating device for an external combustion engine according to claim 1, wherein said external combustion engine is a Stirling engine.

3. The heating device for an external combustion engine according to claim 1, and further including a displacer cylinder having an outer surface, said displacer cylinder being positioned within said combustion housing with said oxidation catalyst being disposed between the outer surface of the displacer cylinder and an inner surface of said combustion housing.

4. The heating device for an external combustion engine according to claim 3, and further including a displacer piston slidably mounted within said displacer cylinder for partitioning an interior of the displacer cylinder into an expansion chamber on a head portion of the cylinder and a compression chamber on a bottom portion of the displacer cylinder.

5. The heating device for an external combustion engine according to claim 4, wherein the heating portion is provided around the head portion of the displacer cylinder for heating the expansion chamber.

6. The heating device for an external combustion engine according to claim 4, and further including a radiator provided on the bottom portion of the displacer cylinder for cooling the compression chamber.

7. The heating device for an external combustion engine according to claim 4, and further including a heat regenerator interposed in a communication port for connecting the expansion chamber to the compression chamber.

8. A heating device for an external combustion engine comprising:
   - a combustion housing;
   - an electrolyte device for generating power, said electrolyte device being disposed to surround the combustion housing;
   - an expansion chamber for the external combustion engine;
   - a heating portion for heating said expansion chamber;
   - a fuel-air mixer provided at one end of said combustion housing;
   - an exhaust pipe provided at the other end of said combustion housing; and
   - an oxidation catalyst, disposed in said combustion housing, for accelerating combustion of a fuel-air mixture of a fuel and air supplied through said fuel-air mixer.

9. The heating device for an external combustion engine according to claim 8, wherein said oxidation catalyst is supported by an outer surface of said heating portion disposed in said combustion housing.

10. The heating device for an external combustion engine according to claim 8, wherein said external combustion engine is a Stirling engine.

11. The heating device for an external combustion engine according to claim 8, and further including a displacer cylinder having an outer surface, said displacer cylinder being positioned within said combustion housing with said oxidation catalyst being disposed between the outer surface of the displacer cylinder and an inner surface of said combustion housing.

12. The heating device for an external combustion engine according to claim 11, and further including a displacer piston slidably mounted within said displacer cylinder for partitioning an interior of the displacer cylinder into the expansion chamber on a head portion of the cylinder and a compression chamber on a bottom portion of the displacer cylinder.

13. The heating device for an external combustion engine according to claim 12, wherein the heating portion is provided around the head portion of the displacer cylinder for heating the expansion chamber.

14. The heating device for an external combustion engine according to claim 12, and further including a radiator provided on the bottom portion of the displacer cylinder for cooling the compression chamber.

15. The heating device for an external combustion engine according to claim 14, and further including a heat regenerator interposed in a communication port for connecting the expansion chamber to the compression chamber.

16. The heating device for an external combustion engine according to claim 12, wherein the oxidation catalyst is directly supported by an outer surface of the head portion of the displacer cylinder for transferring heat directly to the head portion.

* * * * *